(12) United States Patent
Khafagy et al.

(10) Patent No.: US 10,892,635 B2
(45) Date of Patent: Jan. 12, 2021

(54) REDUNDANT POWER SUPPLY

(71) Applicant: Ford Global Technologies, LLC, Dearborn, MI (US)

(72) Inventors: Hafiz Shafeek Khafagy, Dearborn, MI (US); Prasad Venkiteswaran, Canton, MI (US); Donatus Andreas Josephine Kees, Billericay (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 429 days.

(21) Appl. No.: 15/868,695

(22) Filed: Jan. 11, 2018

(65) Prior Publication Data

US 2019/0214844 A1    Jul. 11, 2019

(51) Int. Cl.
| | | |
|---|---|---|
| *B60R 16/033* | (2006.01) | |
| *H02H 3/087* | (2006.01) | |
| *H02J 9/06* | (2006.01) | |

(52) U.S. Cl.
CPC ............ *H02J 9/061* (2013.01); *B60R 16/033* (2013.01); *H02H 3/087* (2013.01)

(58) Field of Classification Search
USPC ....................................................... 307/10.1
See application file for complete search history.

(56) References Cited

U.S. PATENT DOCUMENTS

| | | | |
|---|---|---|---|
| 6,909,201 B2 | 6/2005 | Murty et al. | |
| 7,950,606 B2 | 5/2011 | Atkey et al. | |
| 8,629,573 B2 | 1/2014 | Winkler | |
| 8,738,268 B2 | 5/2014 | Karimi et al. | |
| 9,653,965 B2 | 5/2017 | Klemen et al. | |
| 10,093,250 B2 | 10/2018 | White et al. | |
| 2002/0109406 A1* | 8/2002 | Aberle | B60L 58/30 307/10.1 |
| 2002/0167291 A1 | 11/2002 | Imai et al. | |
| 2008/0215199 A1 | 9/2008 | Aoyama et al. | |
| 2009/0206660 A1 | 8/2009 | Makita et al. | |
| 2015/0148995 A1* | 5/2015 | Scheffler | H02J 1/14 701/3 |
| 2019/0100111 A1* | 4/2019 | Liu | B60L 58/21 |

FOREIGN PATENT DOCUMENTS

| | | |
|---|---|---|
| CN | 104972913 B | 7/2017 |
| DE | 10020304 A1 | 10/2001 |
| DE | 19855245 B4 | 8/2010 |

OTHER PUBLICATIONS

Linear Technology article entitled "48V/12V Automotive Bidirectional Synchoronous Buck or Boost DC/DC Controller Increases Available Power," News Release www.linear.com, dated Sep. 20, 2016.
Non-Final Office Action for U.S. Appl. No. 15/868,716 as issued by the USPTO dated May 13, 2020.

* cited by examiner

*Primary Examiner* — Rexford N Barnie
*Assistant Examiner* — Xuan Ly
(74) *Attorney, Agent, or Firm* — Frank A. MacKenzie; Bejin Bieneman PLC

(57) ABSTRACT

A system includes a first and a second vehicle power distribution buses electrically isolated from one another, a first DC to DC converter electrically connected to the first power distribution bus, and a second DC to DC converter electrically connected to the second power distribution bus. The system includes a first battery electrically connected to the first power distribution bus, and a second battery electrically connected to the second power distribution bus.

10 Claims, 4 Drawing Sheets

REDUNDANT POWER SUPPLY

BACKGROUND

Certain vehicle components rely on electrical power to operate properly. Examples of such components include electric motors, sensors, actuators, and electronic control units. The electrical power for these and other components often comes from the vehicle battery, a vehicle power generator, or the like. An electrical power supply may fail to operate.

DETAILED DESCRIPTION

Introduction

Disclosed herein is a system including first and a second vehicle power distribution buses electrically isolated from one another, a first DC to DC converter electrically connected to the first power distribution bus, a second DC to DC converter electrically connected to the second power distribution bus, a first battery electrically connected to the first power distribution bus, and a second battery electrically connected to the second power distribution bus.

The system may further include a processor programmed to at least one of shut off and turn on an interruptible output terminal of the first vehicle power distribution bus based on a current consumption of the first vehicle power distribution bus, wherein the interruptible output terminal electrically couples the first vehicle distribution bus to a vehicle load.

The processor may be further programmed to shut off the interruptible output terminal upon determining that a first vehicle distribution bus current consumption exceeds a peak load threshold.

The interruptible output terminal may include a relay.

The first DC to DC converter may include a first input terminal connected to a first DC power generator with a first voltage, and a first output terminal with a second voltage less than the first voltage, electrically connected to the first vehicle power distribution bus, and the second DC to DC converter includes a second input terminal connected to a second DC power generator with the first voltage, and a second output terminal with the second voltage, electrically connected to the second vehicle power distribution bus.

The first and second DC power supplies may be electrically isolated DC generators.

The electrically isolated DC generators may be mechanically coupled.

A peak power consumption of the first vehicle power distribution bus is at least equal to a sum of a first DC to DC converter output power and a first battery output power.

A first DC power generator output power may be equal to an average power consumption of the second vehicle power distribution bus.

The first DC power generator may be a DC starter generator and the first DC to DC converter has a boost mode, in which the DC to DC converter transfers electrical energy from the first output terminal to the first input terminal.

Further disclosed is a computing device programmed to execute the any of the above method steps. Yet further disclosed is a vehicle comprising the computing device.

Yet further disclosed is a computer program product, comprising a computer readable medium storing instructions executable by a computer processor, to execute any of the above method steps.

System Elements

Figure 1:
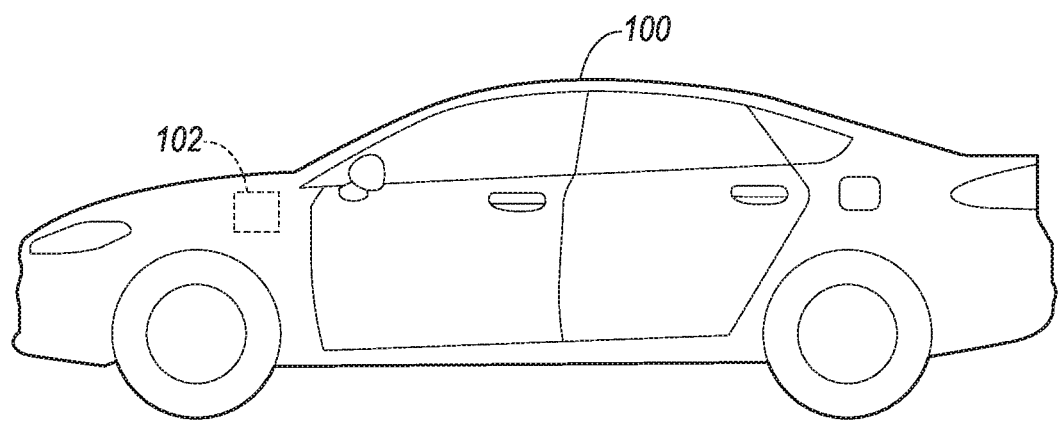
FIG. 1 illustrates an example vehicle including a vehicle system.

FIG. 1 illustrates a vehicle 100 with a power system 102. The vehicle power system 102 is typically necessary for the vehicle 100 to operate, e.g., accelerate, decelerate, steer, and brake. Although illustrated as a sedan, the vehicle 100 may include any passenger or commercial automobile such as a car, a truck, a sport utility vehicle, a crossover vehicle, a van, a minivan, a taxi, a bus, etc. In some possible approaches, the vehicle 100 is an autonomous vehicle that operates in an autonomous (e.g., driverless) mode, a partially or semi-autonomous mode, and/or a non-autonomous mode. For purposes of this disclosure, an autonomous mode is defined as one in which each of vehicle 100 propulsion, braking, and steering are controlled by a computer; in a semi-autonomous mode the computer controls one or two of vehicles 100 propulsion, braking; in a non-autonomous mode a human operator controls each of vehicle 100 propulsion, braking, and steering.

Components of the vehicle power system 102 include a vehicle power generator 108a, 108b, DC (Direct Current)-DC converter 112a, 112b, the vehicle batteries 114a, 114b, and the vehicle power distribution buses 116a, 116b. A power distribution bus 116a, 116b is an electrical connection in the vehicle 100 for transferring electrical power. A power distribution bus 116a, 116b may include a conductive material such as copper or aluminum and may be implemented as wires, plates, etc. Power distribution busses 116a, 116b are typically covered with an insulator to electrically insulate the conducting material, e.g., copper, from other electrically conductive parts of the vehicle 100. In some instances, the power distribution buses 116a, 116b may be bundled in a wire harness. The power distribution bus 116a, 116b may include multiple conducting elements such as copper cables connected via junction elements, e.g., a copper plate connected to cables. In one possible approach, the conducting members such as copper wires included in a distribution bus 116a, 116b may be soldered to the copper plate and/or one another. Alternatively, the power junction element may refer to a conductive cable connector that can attach to a corresponding connector via, e.g., screws, as a part of a wire harness.

The power generator 108a, 108b, e.g., an alternator, converts mechanical energy to electrical energy. For example, the power generator 108a, 108b may convert mechanical energy from a rotating shaft into electrical energy. The electrical energy generated may be in the form of direct current (DC) energy or alternating current (AC) energy. Thus, in one possible approach, the power generators 108a, 108b in the vehicle power system 102 may be implemented as DC power generators 108a, 108b. If an AC power generator 108a, 108b is used, a rectifier circuit can be used to convert the alternating current generated into a direct current. In one example, the power generator 108a, 108b can be mechanically driven by an engine of the vehicle, e.g., a hybrid vehicle, and can generate a high AC voltage such as 300 VAC. The power generator 108a, 108b may include an inverter circuit which can convert the generated high voltage AC to a high DC voltage such as 48 VDC. The high voltage DC may then be fed to DC-DC converters 112a, 112b.

A load 110 is a vehicle 100 component that consumes electrical energy, e.g., electrical actuators(s), controller(s), sensor(s), etc. The loads 110 may include electronic devices that draw power from the vehicle batteries 114a, 114b, the power generator 108a, 108b, etc. Examples of loads 110 may include electrical actuators, such as electrical motors, and electronic components, such as chips and sensors. The loads 110 may be categorized according to how the load 110 contributes to the operation of the vehicle 100. For example, loads 110 may be categorized as either a "standard" load 110 or a "critical" load 110. A standard load 110 is typically a load 110 that is less critical to overall vehicle 100 operation. For example, a load to operate a climate control system is typically a standard load 110 because, while important to occupant comfort, an air conditioner, for example, is typically not required to properly operate the vehicle 100. A critical load is a load 110 supplied to carry out vehicle 100 operations required to operate the vehicle 100, e.g., propulsion, braking, and/or steering.

The DC-DC converters 112a, 112b are one type of electric power converter that can convert direct current (DC) energy from one voltage level to another. For example, a DC-DC converter 112a, 112b may convert a high DC voltage output by the vehicle power generator 108a, 108b to a low voltage DC for use by electronic components in the vehicle 100. The DC-DC converter 112a, 112b may have an input terminal 118 connected to, e.g., the power generators 108a, 108b and an output terminal 120 connected to a power distribution bus 116a, 116b. The DC-DC converters 112a, 112b may each further include a converter having power electronic components such as insulated-gate bipolar transistors (IGBT) and a control circuit. The control circuit may monitor operation of the converter and detect a malfunction in the DC-DC converter 112a, 112b. For instance, the control circuit may be programmed to detect a damaged power electronic component, disconnected or loose wiring to a DC-DC converter terminal, etc. Further, the DC-DC converter 112a, 112b may include a processor programmed to diagnose malfunctions in the DC-DC converter 112a, 112b, the control circuit, or both. The control circuits of the DC-DC converter 112a, 112b may communicate with another circuit through a communication interface that may allow that an external circuit, such a processor, to receive signals, such as a malfunction code, indicating internal information about the DC-DC converter 112a, 112b.

The vehicle batteries 114a, 114b are energy storage devices, such as absorbed glass mat (AGM) batteries. Each of the vehicle batteries 114a, 114b may operate at different voltage and/or power levels. For example, batteries 114a, 114b supplying power to electronic components of the vehicle 100 may have a nominal voltage of 12V DC. Each of the batteries 114a, 114b may have a ground pole connected through a ground line 124 to a metal body of the vehicle 100, and a positive pole connected to the power distribution bus 116a, 116b.

Each of the vehicle power distribution buses 116a, 116b may include an overload protection circuit, e.g., a fuse, that shuts off the vehicle power distribution bus 116a, 116b when a current consumption of the vehicle power distribution bus 116a, 116b exceeds a predetermined threshold.

A vehicle 100 power supply needs to be resilient upon occurrence of safety-critical faults in order to ensure proper operation of the vehicle. Autonomous vehicles 100, including partially or semi-autonomous vehicles 100, typically have significantly higher electrical loads 110 than non-autonomous vehicles because autonomous and semi-autonomous vehicles 100 rely on more sensors and computing devices than their non-autonomous counterparts. Autonomous vehicles rely on power supplies to power those additional sensors and computing devices.

A power supply architecture of the vehicle 100 may be designed to tolerate certain failures, meaning that, even with a partial failure, the power supply allows the vehicle 100 to fulfill certain safety critical functionalities such as operating the vehicle 100 in a limp home mode. The term architecture includes the electrical components and how they are electrically connected to one another. The limp home mode is a mode of operation in which the vehicle 100 operates at least partially to enable a vehicle 100 occupant to reach to a destination, e.g., a service center. In one example, the critical loads 110 may be redundant, e.g., a first and a second computer load 110 with same operation, e.g., steering. In one example, if the first computer load 110 fails to operate, the second computer load 110 may allow a vehicle 100 steering operation in the limp home mode.

The vehicle 100 can include a first and a second vehicle power distribution buses 116a, 116b that are electrically isolated from one another. The vehicle 100 can include a first DC-DC converter 112a electrically connected to the first power distribution bus 116a and a second DC-DC converter 112b electrically connected to the second power distribution bus 116b. The vehicle can include a first battery 114a electrically connected to the first power distribution bus 116a, and a second battery 114b electrically connected to the second power distribution bus 116b.

A first input terminal 118 of the first DC to DC converter 112a may be connected to the first DC power generator 108a that generates electrical energy with a first voltage, e.g., 48 Volt DC. A first output terminal 120 of the first DC to DC converter 112a may output electrical energy with a second voltage, e.g., 12 Volt DC, less than the first voltage, e.g., 48 Volt DC, and can be electrically connected to the first vehicle power distribution bus 116a.

A second input terminal 118 of the second DC to DC converter 112b may be connected to the second DC power supply 108b that generates electrical energy with the first voltage, and a second output terminal 120 of the second DC to DC converter 112b may output electrical energy with the second voltage, and may be electrically connected to the second vehicle power distribution bus 116b. Thus, the first and second DC power generators 108a, 108b may be electrically isolated. Alternatively, the vehicle power system 102 may include one DC power supply 108 that is electrically connected to the first and second DC to DC converters 112a, 112b. Thus, the first and second input terminals 118 of the first and second DC to DC converters 112a, 112b may be electrically connected to the single DC power supply 108.

Although, the first and second DC power generators 108a, 108b may be electrically isolated, the first and second DC power generators 108a, 108b may be mechanically coupled to one another. For example, each of the first and second DC power generators 108a, 108b may include power generators that are mechanically coupled to a vehicle 100 engine shaft. Thus, mechanical energy generated by the vehicle 100 engine may rotate a shaft of the power generators and generate electrical power.

A peak power consumption of the first vehicle power distribution bus 116a may be at least equal to a sum of a first DC to DC converter 112a output power and a first battery 114a output power. Additionally or alternatively, a peak power consumption of the second vehicle power distribution bus 116*b* may be at least equal to a sum of a second DC to DC converter 112*b* output power and a second battery 114*b* output power.

"Electrical power" means a rate at which electric energy is transferred by an electric circuit. Electrical power may be specified in units of watts (W). In the present disclosure, electrical power generated by, e.g., the DC power generators 108*a*, 108*b*, is referred to as output power, whereas electrical power consumed by, e.g., the loads 110, is referred to as consumed power or power consumption. A load 110 may have an average and a peak power consumption. The average power consumption is the electrical power that a load 110 consumes after ending an initialization time, e.g., 300 milliseconds. The initialization time, in the present context, is a duration of time since turning on the load 110 until the load 110 power consumption reaches the average power consumption. The peak power consumption is the electrical power that a load 110 consumes, e.g., during the initialization time, and/or other vehicle 100 operating conditions such as excessive acceleration, braking, etc. A peak power consumption may be several times more than the average power consumption.

The vehicle power system 102 may address the peak power consumption of the loads 110 by including DC power generators 108*a*, 108*b* that can output power equal to the peak power consumption and also by including DC to DC converters 112*a*, 112*b* that can convert and output electrical power equal to the peak power consumption of the loads 110. Thus, the DC power generators 108*a*, 108*b* and/or DC to DC converters 112*a*, 112*b* can output power equal to the peak power consumption although that is typically needed only during peak power consumption period of the loads 110, 122 such as an initialization time, e.g., 300 ms. Physical dimensions and/or cost of the DC power generators 108*a*, 108*b*, and the DC to DC converters 112*a*, 112*b* increase based on an increase of their output power. Thus, physical dimensions and/or cost of the DC power generators 108*a*, 108*b*, and the DC to DC converters 112*a*, 112*b*, which can output power equal to the peak power consumption, are higher compared to the physical dimensions and/or cost of the DC to DC converters 112*a*, 112*b* and/or DC power generators 108*a*, 108*b* that can output power equal to the average power consumption of the loads 110. One problem solved herein is that, by including the first battery 114*a* that can output electrical power equal to or greater than a difference between the peak power consumption and the first DC power generators 108*a*, the first DC power generators 108*a* may be selected based on the average power consumption of the loads 110. In other words, the batteries 114*a*, 114*b* provide the additional power necessary during the initialization time. After the initialization time, the DC power generators 108*a*, 108*b* and DC to DC converters 112*a*, 112*b* are able to provide sufficient power to the loads 110.

As discussed above, the DC power generators 108*a*, 108*b* may be mechanically coupled to the vehicle 100 engine. Typically, a vehicle 100 with an engine includes a starter that is mechanically coupled to a vehicle 100 battery and cranks the vehicle 100 engine to start by consuming electrical energy from a vehicle 100 battery. In one example, the first DC power generator 108*a* may be a DC starter generator and the first DC to DC converter 112*a* may have a boost mode, in which the DC to DC converter transfers electrical energy from the first output terminal 120 to the first input terminal 118. In other words, the first DC to DC converter 112*a* may be configured to receive electrical energy from the first battery 114*a* and output electrical energy to the DC starter generator to start the vehicle 100 engine. Thus, the DC starter generator may operate in a starter mode to start the engine, i.e., operating as an electrical motor which converts electrical power to mechanical power to rotate the engine shaft to start the engine. Thus, advantageously, the vehicle 100 engine may be started without a battery electrically connected to the DC starter generator. This is beneficial, because a cost, weight, and/or dimensions of a battery increases based on the battery voltage. Therefore, starting the vehicle 100 engine based on electrical energy received from the first battery 114*a* with the second voltage, e.g., 12 Volt, is advantageous regarding saving space, weight, and/or cost.

As discussed above, the vehicle 100 may include the first and second computer loads 110 with the same operation, e.g., steering. If the first computer load 110 fails to operate and the second computer load 110 operates, then the vehicle 100 steering may still operate. However, if the first and second computer loads 110 are supplied by same power supply, then a failed power supply may lead to failing the vehicle 100 steering operation. Therefore, in one example, the first and second computer loads 110 may be supplied by the first and second vehicle distribution buses 116*a*, 116*b* respectively. Thus, advantageously, if, e.g., the first vehicle power distribution bus 116*a* fails to operate, then the second vehicle power distribution bus 116*b* may provide electrical energy to the second computer load 110 and may enable vehicle 100 steering to operate.

Figure 2:
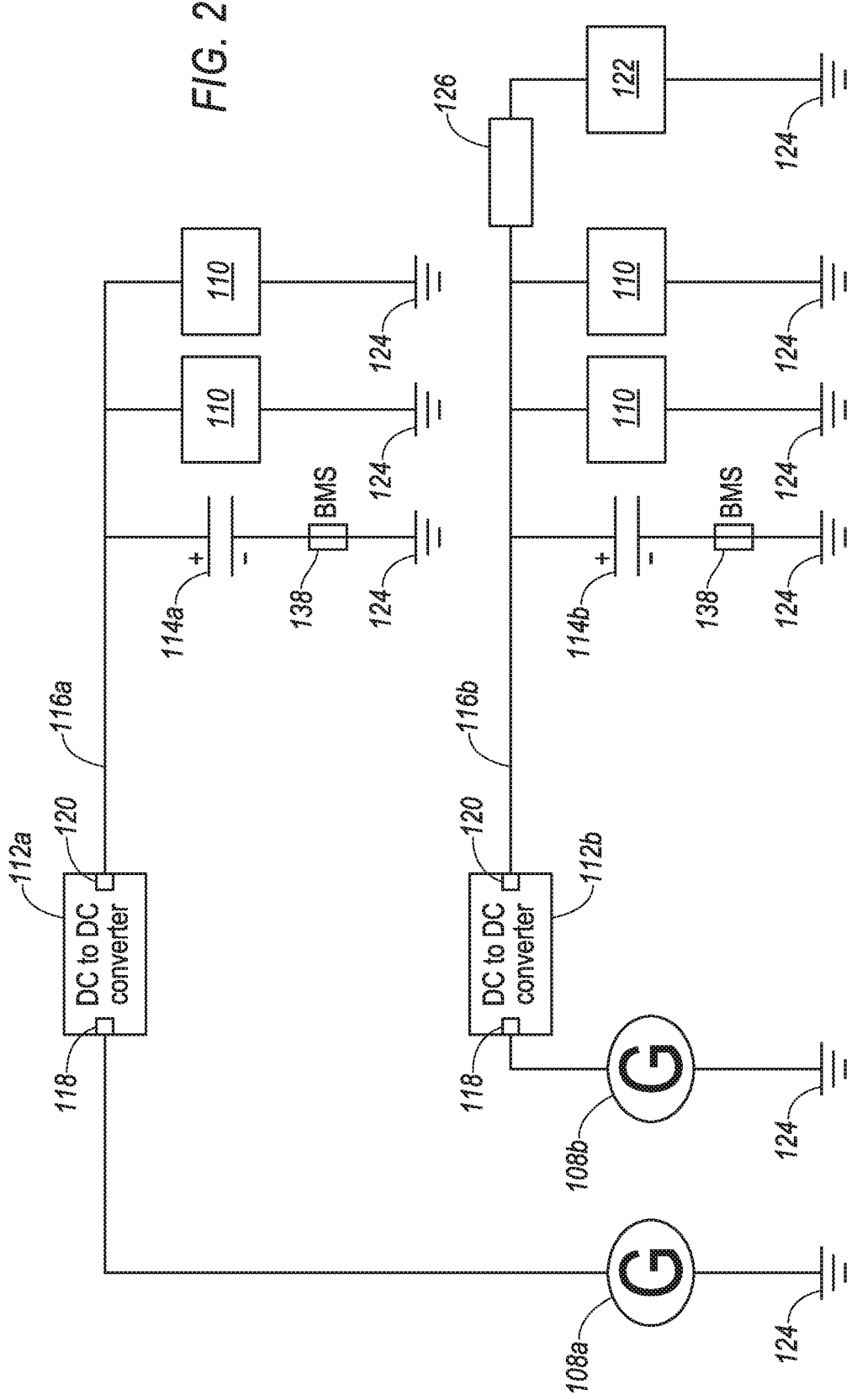
FIG. 2 illustrates an electrical schematic of the vehicle system incorporated in the vehicle.
Figure 3:
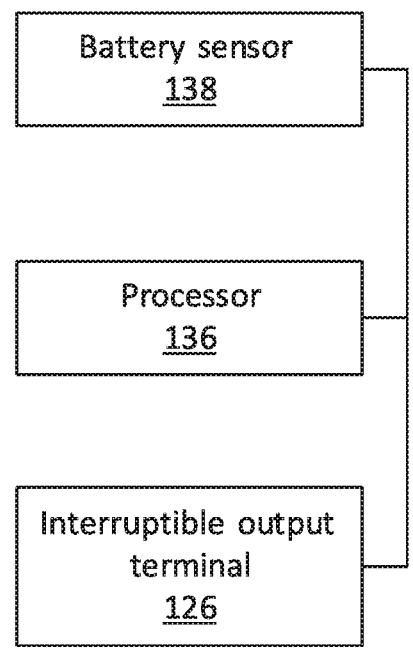
FIG. 3 is a block diagram control circuit for an interruptible output terminal.

As discussed above the vehicle power system 102 may include standard loads 110 and/or critical loads 110. For example, a load 110 for propulsion, steering, and/or braking operation may be critical, whereas a load 110 such as an air conditioner, seat heating, etc., may be standard (i.e., less critical). As shown in FIG. 3, the vehicle power system 102 may include a processor 136 and an interruptible output terminal 126 to control the supply of power to a standard interruptible load 122, e.g., an aftermarket fridge. The processor 136, the interruptible output terminal 126, and the battery sensor 138 may communicate with one another via, e.g., the vehicle 100 communication network, etc. With reference to FIGS. 2-3, the processor 136 may be programmed to shut off and/or turn on the interruptible output terminal 126, e.g., a relay, of the second vehicle power distribution bus 116*b* based on a current consumption of the second vehicle power distribution bus 116*b*. The interruptible output terminal 126 may electrically couple the second vehicle distribution bus 116*b* to, e.g., a standard interruptible load 122.

A battery sensor 138 may be implemented as one or more sensors that provide precise current, voltage, and temperature measurements from the vehicle battery 114*a*, 114*b*. Battery monitoring sensors 138 may include a shunt resistor connected to a pole of the battery 114*a*, 114*b*. Electrical current supplied by the battery 114*a*, 114*b* flows through the shunt resistor. The sensor 138 may measure a voltage drop across the shunt resistor to measure the current supplied by (or output power of) the battery 114*a*, 114*b*. The battery sensor 138 may determine a temperature, health condition, etc., of the battery 114*a*, 114*b* based at least in part on the measured current amount. Battery sensors 138 may include a processor and a communication interface, e.g., Local Interconnect Network (LIN), to communicate with the processor 136. The processor 136 may be programmed to receive output power consumption of the DC to DC converter 112*b*, e.g., via the vehicle 100 communication network. The processor 136 may be programmed to determine the power consumption of the second vehicle power distribution bus 116*b* based on the received output power consumption of the DC to DC converter 112b and/or the received data from the battery sensor 138. For example, the processor 136 may be programmed to determine the power consumption of the second vehicle power distribution bus 116b based on an addition of the output power consumption of the DC to DC converter 112b and the measured output power of the battery 114b.

The processor 136 may be programmed to shut off the interruptible output terminal 126 upon determining that the second vehicle distribution bus 116b current consumption exceeds a first threshold, e.g., 90% of the specified peak current consumption of the second vehicle power distribution bus 116b. For example, the second vehicle power distribution bus may have a peak power consumptions of 100 Ampere (A), and the processor 136 may be programmed to turn off the interruptible output terminal 126 when the power consumption of the second vehicle distribution bus 116b exceeds the first threshold, e.g., 90 A (i.e., 90% of 100 A). The processor 136 may be programmed to determine the current consumption of the second vehicle distribution bus 116b based on data received from a battery sensor 138.

Additionally or alternatively, the processor 136 may be programmed to shut off an interruptible output terminal 126 electrically connected to the first vehicle power distribution bus 116a.

Additionally or alternatively, the processor 136 may be programmed to shut off the interruptible output terminal 126 upon detecting a fault condition. A fault (or fault condition) is a condition in which a component fails to operate or operates outside of one or more predefined parameters (e.g., a predefined parameter could be a physical quantity such as electric current, electric power, electric voltage, temperature, etc.) Thus, advantageously, shutting off the standard interruptible load 122 may prevent an interruption of supplying power to the critical loads 110. For example, the processor 136 may be programmed to shut off the interruptible terminal 126 upon determining that the DC to DC converter 112b is overheated, e.g., a temperature of electrical components inside the DC to DC converter 112b exceeded a predetermined threshold, e.g., 100 degrees Celsius. In one example, turning off the interruptible terminal 126 reduces a consumed electric power of the second vehicle distribution bus 116b and may prevent a failure of the DC to DC converter 112b. Thus, advantageously, an interruption of supplying power to critical loads 110 may be prevented.

As discussed above, peak power consumption of loads 110, e.g., during initialization time, contribute to the peak power consumption of the vehicle distribution bus 116b. Thus, advantageously, tuning off the interruptible output terminal 126 may help ensuring that the power consumption of the second vehicle power distribution bus 116b is maintained below the peak power consumption of the second vehicle distribution bus 116b. As an additional advantage, turning off the interruptible output terminal 126 may prevent a discharge of power from the battery 114b which may extend a useful life of the battery 114b. As discussed above, the battery 114b may supply the electric power (i.e., operating in a discharge mode in which the battery 114b outputs electric power) when the power consumption of the second vehicle distribution bus 116b exceeds the second DC to DC converter 112b output power. Each changes of operation of the battery 114b between discharge mode and charge mode (i.e., being charged by the second DC to DC converter 112b) is referred to as a cycle. An increase of a number of battery 114b cycles may reduce the useful life of the battery 114b.

The processor 136 may be programmed to turn on the interruptible output terminal 126 upon determining that the power consumption of the second vehicle power distribution bus 116b is below a second threshold, e.g., 105% of the average power consumption of the second vehicle distribution bus 116b including an average power consumption of the loads 110 and the standard interruptible load 122. For example, the second vehicle power distribution bus 116b may have an average power consumption of 40 A, and the processor 136 may be programmed to turn on the interruptible output terminal 126 upon determining that the power consumption of the second vehicle distribution bus 116b is less than the second threshold, e.g., 42 A (i.e., 105% of 40 A).

Processing

Figure 4:
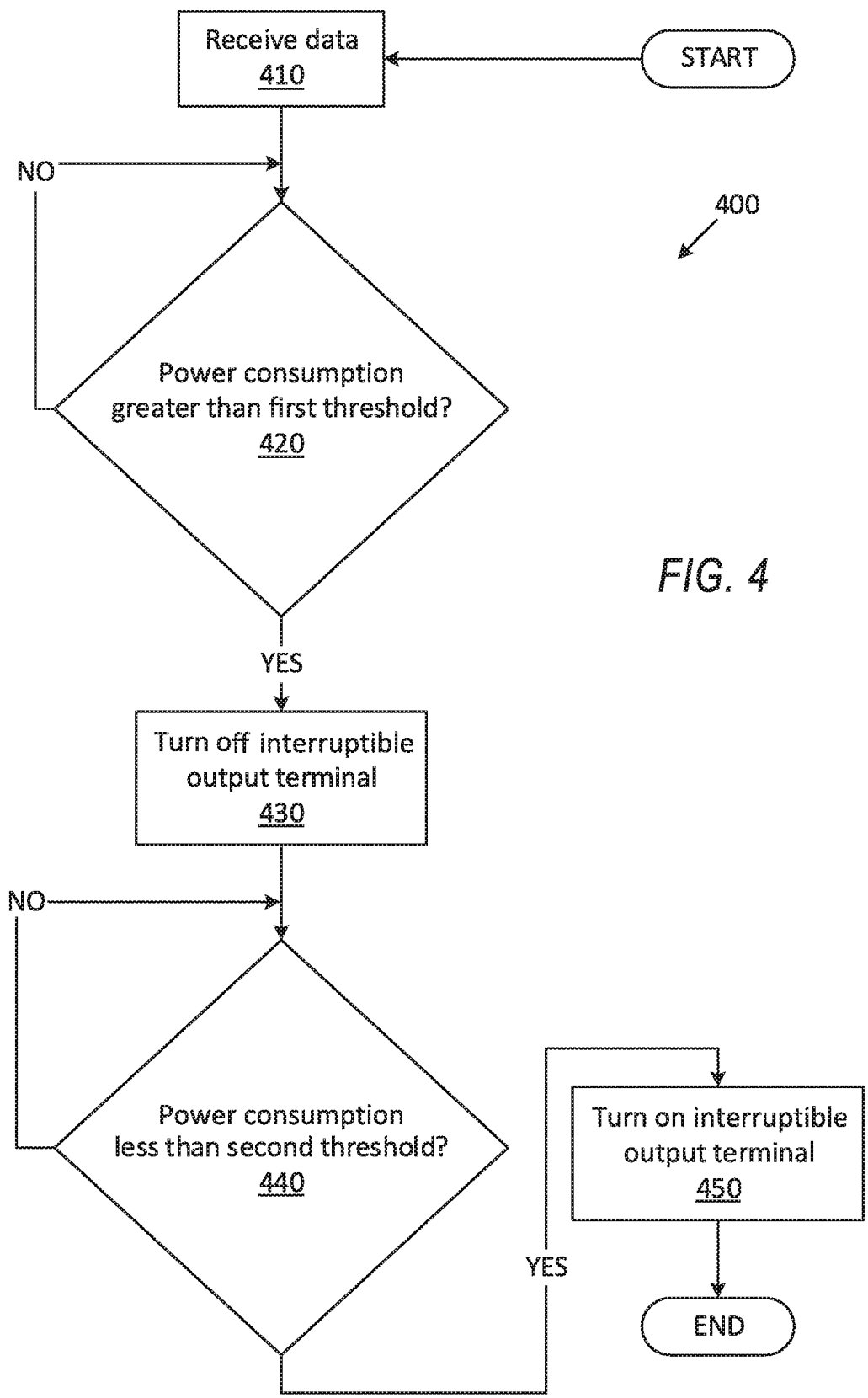
FIG. 4 is a flowchart of an example process for controlling an interruptible output terminal of a vehicle power supply.

FIG. 4 is a flowchart of an example process 400 for controlling an interruptible output terminal 126 of a vehicle power supply. For example, the processor 136 may be programmed to execute blocks of the process 400 to control the interruptible output terminal 126.

The process 400 begins in a block 410, in which the processor 136 receives data, e.g., from the battery sensors 138. The processor 136 may be programmed to receive data including current power consumption, health condition, etc., of the second vehicle power distribution bus 116b from the battery sensor 138. The processor 136 may be programmed to receive data from the DC-DC converter 112b including the output power of the DC-DC converter 112b, e.g., via a vehicle 100 communication network. The processor 136 may be programmed to determine the power consumption of the second vehicle power distribution bus 116b based on the received data from the battery sensor 138, the DC-DC converter 112b, and/or data stored in the processor 136 memory such as a peak power consumption of the standard interruptible load 122.

Next, in a decision block 420, the processor 136 determines whether the power consumption of the second vehicle distribution bus 116b exceeds the first threshold, e.g., 90% of the peak power consumption of the loads 110, 122. If the processor 136 determines that the power consumption of the second vehicle distribution bus 116b exceeds the first threshold, then the process 400 proceeds to a block 430; otherwise the process 400 returns to the decision block 420.

In the block 430, the processor 136 turns off the interruptible output terminal 126. The processor 136 may be programmed to actuate the interruptible output terminal 126 to turn off, i.e., disconnect the second vehicle power distribution bus 116b from the standard (less critical) interruptible load 122.

Next, in a decision block 440, the processor 136 determines whether the power consumption of loads 110 connected to the second vehicle power distribution bus 116b is less than the second threshold, e.g., 105% of the average power consumption of the loads 110 supplied by the second power distribution bus 116b. If the processor 136 determines that the power consumption is less than the second threshold, then the process 400 proceeds to a block 450; otherwise the process 400 returns to the decision block 440.

In the block 450, the processor 136 turns on the interruptible output terminal 126. The processor 136 may be programmed to actuate the interruptible output terminal 126 to turn on, i.e., supplying power to the standard (less critical) interruptible load 122.

Following the block 450, the process 400 ends, or alternatively returns to the block 410, although not shown in FIG. 4.

Unless indicated explicitly to the contrary, "based on" means "based at least in part on" and/or "based entirely on."

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system comprising:
   first and a second vehicle power distribution buses electrically isolated from one another;
   a first DC to DC converter including;
   a first input terminal connected to a first DC power generator with a first voltage; and
   a first output terminal with a second voltage less than the first voltage, electrically connected to the first vehicle power distribution bus;
   a second DC to DC converter including:
   a second input terminal connected to a second DC power generator with the first voltage; and
   a second output terminal with the second voltage, electrically connected to the second power distribution bus;
   a first battery electrically connected to the first power distribution bus; and
   a second battery electrically connected to the second power distribution bus.

2. The system of claim 1, further comprising a processor programmed to at least one of shut off and turn on an interruptible output terminal of the first vehicle power distribution bus based on a current consumption of the first vehicle power distribution bus, wherein the interruptible output terminal electrically couples the first vehicle distribution bus to a vehicle load.

3. The system of claim 2, wherein the processor is further programmed to shut off the interruptible output terminal upon determining that a first vehicle distribution bus current consumption exceeds a peak load threshold.

4. The system of claim 2, wherein the interruptible output terminal includes a relay.

5. The system of claim 1, wherein the first and second DC power supplies are electrically isolated DC generators.

6. The system of claim 5, wherein the electrically isolated DC generators are mechanically coupled.

7. The system of claim 1, wherein a peak power consumption of the first vehicle power distribution bus is at least equal to a sum of a first DC to DC converter output power and a first battery output power.

8. The system of claim 1, wherein a first DC power generator output power is equal to an average power consumption of the second vehicle power distribution bus.

9. The system of claim 1, wherein the first DC power generator is a DC starter generator and the first DC to DC converter has a boost mode, in which the DC to DC converter transfers electrical energy from the first output terminal to the first input terminal.

10. The system of claim 1, further comprising a processor programmed to:
   upon receiving a request to start a vehicle engine mechanically coupled to the first power generator, operate the first DC to DC converter in a boost mode transferring electrical energy of the first battery from the first output terminal to the first input terminal;
   operate the first power generator in a start mode to start the vehicle engine, wherein the first power generator receives electrical energy from the first input terminal of the first DC to DC converter.

* * * * *